United States Patent [19]

Utner et al.

[11] 4,250,604

[45] Feb. 17, 1981

[54] PROCESS FOR THE PRODUCTION OF ELECTRIC STACKED CAPACITORS

[75] Inventors: Ferdinand Utner; Harald Vetter, both of Regensburg, Fed. Rep. of Germany; Gerhart Vilsmeier, Glendale, Ariz.

[73] Assignee: Siemens Aktiengesellschaft, Berlin & Munich, Fed. Rep. of Germany

[21] Appl. No.: 971,008

[22] Filed: Dec. 19, 1978

[30] Foreign Application Priority Data

Dec. 30, 1977 [DE] Fed. Rep. of Germany ....... 2758913

[51] Int. Cl.³ .............................................. H01G 4/30
[52] U.S. Cl. .................................. 29/25.42; 242/56.1
[58] Field of Search ...................... 29/25.42; 242/56.1; 361/303, 304, 324, 309

[56] References Cited

U.S. PATENT DOCUMENTS

| | | | |
|---|---|---|---|
| 2,882,586 | 4/1959 | Shen | 29/25.42 |
| 4,128,926 | 12/1978 | Gaenge et al. | 29/25.42 |

Primary Examiner—Carl E. Hall
Attorney, Agent, or Firm—Hill, Van Santen, Steadman, Chiara & Simpson

[57] ABSTRACT

A process for producing electric stacked capacitors including forming a folded track of capacitor materials which is only a fraction of the thickness of the final capacitor, cutting the folded track into segments equalling the length of the capacitor, stacking the segments on a conveyor belt, hardening the stack, providing external contacts and encasing the capacitor. The process may include placing the folded track on their folded edges and applying pressure between a pair of clamps which have recesses to allow the subsequent forming of the contact regions by a metal spraying process.

14 Claims, 5 Drawing Figures

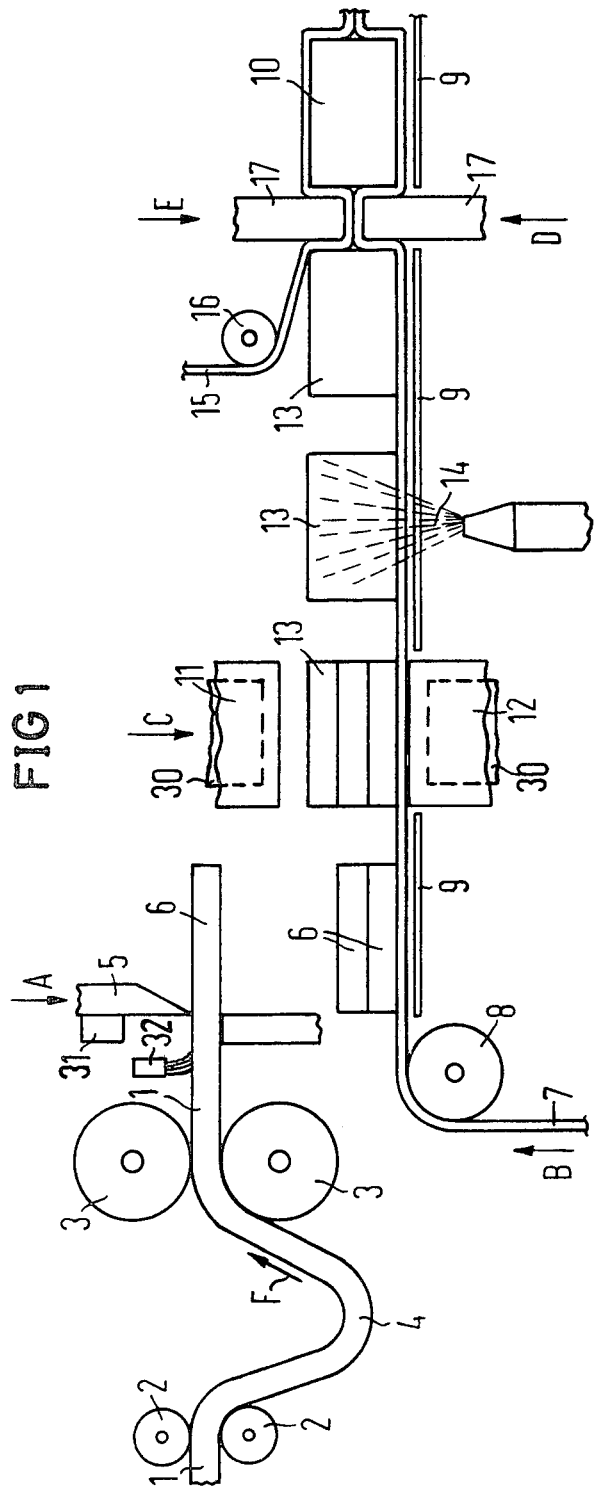
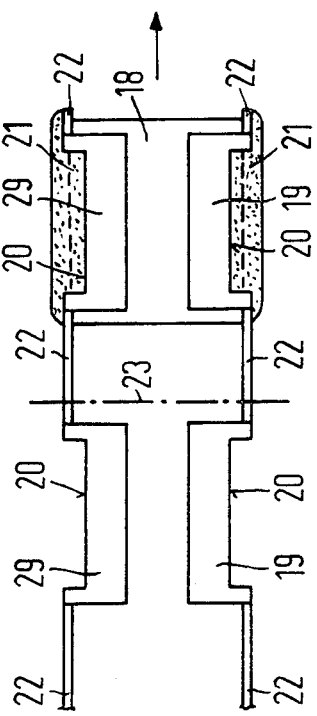

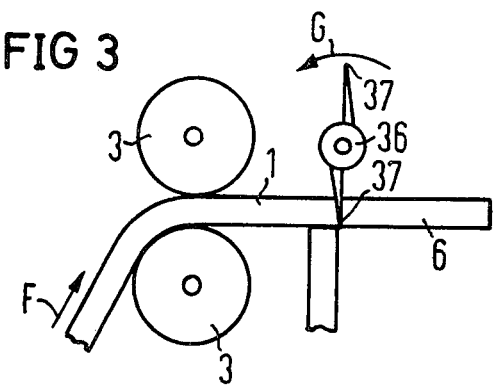
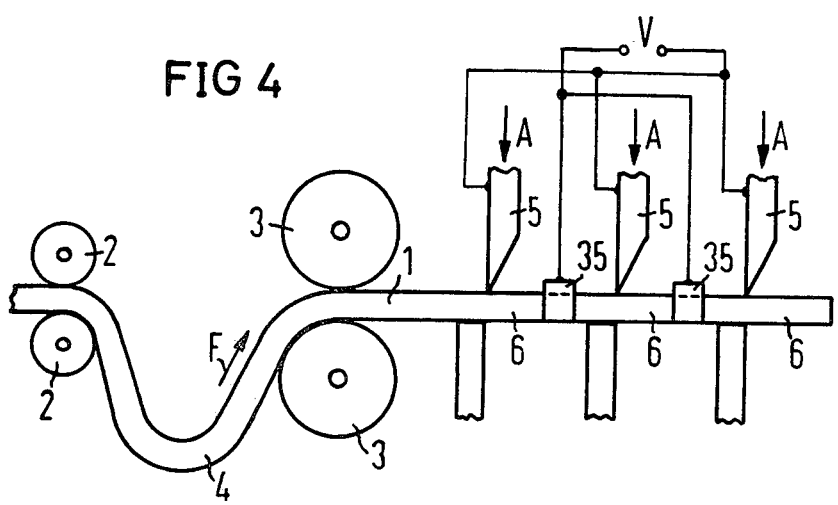
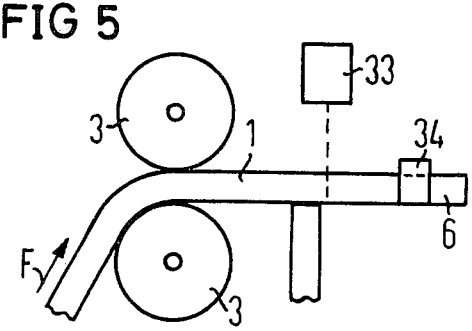

PROCESS FOR THE PRODUCTION OF ELECTRIC STACKED CAPACITORS

BACKGROUND OF THE INVENTION

1. Field of the Invention

The field of art to which this pertains is a process for forming stacked capacitors by the use of folded capacitor segments.

2. Description of the Prior Art

A prior art capacitor is shown in U.S. Pat. No. 2,882,586 which is formed from a folded track. The folded track is moved forward and various processing steps require long stopping times according to that Patent. In particular, these steps are welding in the area of metal-free strips between the individual folded track segments, hardening of the folded track by means of pressure and heat, and, finally, severing by means of cutters. The time that is needed for these fabrication steps is relatively long since the folded track initially contains all of the layers necessary for a capacitor and, thus, is relatively thick and large-surfaced. Moreover, in the prior art, the cut-off folded track segment must, at that point in the process, exhibit the solidity required for the use of the capacitor.

SUMMARY OF THE INVENTION

It is an object of the present invention to provide a stacked capacitor using folded capacitor tracks having less than the final capacitor thickness and processing the tracks through various steps including cutting, stacking, hardening, spraying metallized contacts and encasing.

It is also an object of the present invention to perform the above process by a step which includes placing the folded track segments on their folded edges and clamping the edges to later provide external contacts by a metal spraying process.

Finally, it is an object of the invention to shorten the stopping times between production steps in the method described above.

BRIEF DESCRIPTION OF THE DRAWINGS

FIG. 1 is a schematic showing the steps of the inventive process.

FIG. 2 shows, in partially broken view, the mounting of the stacked capacitor between conveyor belts and clamping the same together for end metal spraying.

FIG. 3 illustrates a form of the invention using a rotating cutter for cutting the folded track into segments without stopping its movement.

FIG. 4 illustrates the use of a plurality of cutters each having a designated voltage applied to destroy the capacitor coatings at the edges where the cutting action occurs.

FIG. 5 illustrates the use of a laser beam as a cutting tool for the folded track and a capacitance measuring means for adjusting the cutting point on the track.

DESCRIPTION OF THE PREFERRED EMBODIMENTS

The present invention relates to a process for the production of electric stacked capacitors in which at least one metallized synthetic band of a multiple width of the capacitor to be produced is folded into a folded track in such a manner that the folds lie in the longitudinal direction of the synthetic band. This folded track contains at least two capacitor coatings and an intervening dielectric. The track is divided by at least one cutter into folded track segments in the length of an individual capacitor, is frontally contacted in the area of the folds, and is provided with external connections.

This process has the advantage that the relatively thin folded track, which usually is only a small fraction of the capacitor thickness, can very quickly and easily be separated into folded track segments by means of the cutter, and that the hardening of the folded track necessary for further processing may be achieved by means of the cutting procedure. The additional work steps required for this in the prior art, namely, welding in the area of metal-free zones at the edge of the folded track segments to be later cut off and the hardening by means of pressure and heat, are done away with. Moreover, according to the proposed process, an entire series of capacitances can be produced with only one folded track thickness. Thereby, the warehousing and, if necessary, the pre-fabrication of the folded tracks is rationalized. For the production of large capacitances, too, the discontinuous process proposed elsewhere, namely, a winding of the folded track on a wheel in order to form master capacitors of the required thickness, can be avoided. The stacked folded track segments can be hardened and frontally contracted without having to interrupt the production of the folded track and the separation into folded track segments for processes which require a relatively long time. Thus, high fabrication speed can be attained.

The fabrication speed is further advantageously increased in that two or more folded track segments are simultaneously cut off by means of a corresponding number of cutters. The folding procedure continues during the cutting-off stage, and the resulting slack developed in the folded track ahead of the cutters is allowed to form a loose loop having a variable length. Because of this loose loop, it is possible to allow the production of the folded track to proceed continuously, since the end of the folded track can be briefly arrested during the cutting procedure. This brief stopping of the end of the folded track can also be avoided by using rotating cutter wheel with cutters that are essentially radially arranged, with the speed of the cutter edges in the moving direction of the folded track being equal to that track's longitudinal speed.

An improved hardening of the folded track segments is achieved by using cutters that are heated to unite the individual layers of the synthetic band with one another in the area of the cutting edges. If the folded track contains relatively thick and stiff capacitor foils, then it is advantageous that the synthetic band be coated with adhesives on at least one side and that the individual layers of a folded track and, if necessary, the superimposed folded track segments, be glued to one another by means of pressure. A simple and clean operation is achieved in this process in that a thermoplastic synthetic that does not stick at the temperature of the folding mechanism is applied as an adhesive, and in that pressure and heat are applied for the hardening and cementing of the folded track or of the superimposed folded track segments, respectively.

To produce large capacitances, it is advantageous that, after the folding, the adhesive be applied only to the surface of the folded track and, thus, only the folded track segments, but not the individual layers of a folded track, are glued to one another. High capacitances produced from thin capacitor foils have the characteristic that the adhesion created upon separation is doubtless sufficient for the individual folded track segment; but, because of the large surface and number of folded track segments arranged on top of one another, an additional cementing of these folded track segments to one another is desirable. Particularly in the case of large capacitances and especially thin capacitance foils, a given volume capacitance would be undesirably diminished if an adhesive layer were applied to each individual ply of the capacitor foils.

In order to attain good mutual insulation of the metal coatings, an electric voltage is applied between the cutter and the metallizations. This voltage is suitable for eliminating the edge zone of the coatings during the cutting procedure.

A simple and automatable embodiment of the process is accomplished in that the folded track segments are stacked on a non-metallized conveying foil made of a synthetic (or plastic) material, in that this conveying foil delivers the stacks to the remaining fabrication steps, and in that, after the contacting, a second non-metallized synthetic foil is positioned over the stack and welded to the conveying foil.

Another embodiment of the invention which provides a stable capacitor is accomplished by inserting the folded track segments into contacting clamps in such manner that the contacting clamps encompass the fold edges. These contacting clamps have recesses in the area of the fold edges, and an electrically conductive connection to one respective coating is produced in these recesses. The folded track segments are placed perpendicular on their fold edges by means of a vibrator conveyor and are brought upright into a U-shaped contacting clamp that is connected in one piece with a metal conveyor belt. A second contacting clamp, connected in one piece to a second conveyor belt, is pushed over the stack of folded track segments. The folded capacitor is hardened by means of pressure and, if necessary, heat, is frontally contacted in the area of the recesses of the contacting clamps by means of a metal spray process, and is separated from the conveyor belt in such a manner that parts of the conveyor belt remain on the contacting clamps as external connections.

The folded track segments are severed from the folded track particularly cleanly by means of one or a plurality of light or laser beams arranged successively in the moving direction of the folded track, without thereby having to interrupt the movement of the folded track. In this way, a good insulation of the cut edges can be attained in that, first, metal-free strips are formed by means of one or a plurality of laser beams next to the proposed cut edges and, then, the folded track segments are severed.

The last-named embodiment of the process makes it possible that, first, the coating surfaces of a folded track segment are severed by means of a laser beam, that the capacitance of the coating surfaces are measured, and that the width of the metal-free strip is automatically adjusted according to this measurement in such manner that the capacitance of the capacitor is brought to a desired value.

The capacitance tolerance of the component parts may be reduced when the capacitance of a folded track segment is measured in such a manner and the length of the folded track segment is automatically adjusted according to this measurement.

Specifically, referring to FIG. 1, a folded track 1 is conducted by pairs of drive wheels 2 or 3, respectively, in a loose loop 4. A cutter 5, which moves in the direction of the arrow A, cuts folded track segments 6 from the folded track 1 while the drive rollers 3 briefly arrest the feed of the folded track 1. During this arrest, the drive rollers 2 continue to operate, so that the loosely conducted loop 4 is enlarged. After the cutting of the folded track segment 6, the drive wheels 3 push the folded track forward faster than the drive wheels 2, so that the median size of the loosely conducted loop 4 remains constant. The folded track segments 6 are stacked on a nonmetallized conveyor belt 7 made of a synthetic material. This conveyor belt proceeds step-by-step in the direction of arrow B over a roller 8 and gliding planes 9. The step-by-step movement of the conveyor belt 7 is accomplished by means of a nonillustrated driving installation, which, for example, may engage the belt at the point where the capacitors 10 are completed. The cutter 5 is heated by heater means 31 to cause the individual synthetic layers to be joined together during cutting.

The folded track segments 6 are coated with an adhesive by coating means 32 and hardened and glued together by means of a stamp 11, which presses the folded track segment 6 against a support 12 in direction C. The stamp 11 and the support 12 can advantageously be heated by heater means 30, in order to effect the hardening of the stack 13 composed of the folded track segments 6. The stack 13 is completely covered with spray metal layers on both sides by means of the schoop process. The stack 13 is now covered with a non-metallized synthetic (or plastic) foil 15, which is supplied via a roller 16. The non-metallized synthetic foil 15 is bonded to the conveyor belt 7 by means of heated stamps 17, which move in the arrow directions D or E, respectively. The completely sheathed capacitor 10 results behind the stamps 17. This capacitor remains connected with the capacitor 10 previously or subsequently produced via the non-metallized synthetic foils 7, 15. If so desired, it can remain attached until separated by the consumer by cutting through the non-metallized synthetic foils 7, 15. If required, connection wires can be welded or soldered onto the schoop layers, which are still accessible on the finished capacitor 10. Two or more folded track segments 6 are simultaneously cut off by means of a corresponding number of cutters 5 (FIG. 4). An electrical voltage V between the cutters 5 and the contacting means 35 which contact the metallisations of the metallized synthetic band destroys the end area of the capacitor coatings during the cutting procedure.

A rotating cutter wheel 36 (FIG. 3) with cutterblades arranged essentially radially with the speed of the cutter edges 37 in the moving direction F of the folded track 1 being equal to that track's longitudinal speed cuts the folded track 1 without stopping the moving of the track 1.

A laserbeam from a laser 33 (FIG. 5) first forms metal-free strips next to the cut edges to be generated, a measuring means 34 measures the capacitance of the capacitor coatings and adjusts the width of said metal-free strips according to this measurement in such manner that the capacitance of the capacitor is brought to a desired value, said laser beam then cuts the track. In FIG. 2, a stack 18 of folded track segments standing upright is inserted between two clamps 19, 29 that are bent into a U-shaped and connected integrally with a conveyor belt. The bent, U-shaped clamps 19, 29 have recesses 20 in the area of the fold edges. In the area of these recesses 20, spray metal layers 21 are applied in accord with schoop metalization. These spray metal layers 21 contact one coating each and produce a mechanically firm and electrically conductive connection to the U-shaped clamps 19, 29. External connection strips 22 are connected in a single piece with the U-shaped clamps 19, 29. After fabrication, the individual capacitors can be separated from one another along the separating lines 23—again, if so desired, by the consumer—in such a manner that the external connections 22 remain on the corresponding capacitor in the desired length.

Thus, for example, so-called "by-pass capacitors" for radio interference suppression can be manufactured, in that the separating line 23 is arranged in the middle between two neighboring capacitors. By-pass capacitors are constructed in such a manner that the coatings can be connected to the circuit to be cleared of interference with the lowest possible inductance. This is particularly guaranteed in the present case, since the current is conducted directly through the schoop layer or, respectively, through the U-shaped holding clamps 19, 29.

The spray metal layers 21 can completely cover the transport grid. This, however, is not necessary as it is sufficient when they only cover the recesses and the adjacent metal areas of the U-shaped clamps 19, 29.

It will be understood that various modifications of the invention can be accomplished without departing from the spirit and scope of the claims herein.

We claim:

1. A process for the production of electric stacked capacitors having at least one metallized synthetic band of a width which is a multiple of the width of the to-be-formed stacked capacitor, the band being folded into a folded track in its longitudinal direction, the folded track having a least two capacitor coatings and an intermediate dielectric, comprising the steps of: providing said folded track with fewer layers than is required in the to-be-formed stacked capacitor, cutting the folded track into track segments which are of the length of the to-be-formed capacitor, stacking a plurality of said track segments on top of each other, bonding the resulting stack, and frontally contacting said hardened stack.

2. A process according to claim 1 wherein two or more folded track segments are simultaneously cut off by means of a corresponding number of cutters, in that the folding procedure continues during the cutting-off, and in that the folded track in front of the cutters is caused to form a loose loop having a changeable length.

3. A process according to claim 1 wherein the folded track is cut by means of a rotating cutter wheel with cutter blades arranged essentially radially and wherein the speed of the cutter blades in the moving direction of the folded track is equal to the speed of travel of the folded track.

4. A process according to claim 1 including heating the cutter blades so that the individual layers of the synthetic band are united to one another in the area of the cut edges by means of said heated cutter blades.

5. A process according to claim 1 including coating the synthetic band with an adhesive on at least one side and providing that the folded track segments lying on top of one another are glued to one another by means of pressure.

6. A process according to claim 5 including using as said adhesive a thermoplastic synthetic that does not stick at the temperature of the folding process and including applying pressure and heat for the hardening and adhesion of the folded track segments lying on top of one another.

7. A process according to claim 1 including applying an electric voltage between the cutter blades and the metallization which is suitable for destroying an edge area of the capacitor coatings during the cutting procedure.

8. A process according to claim 1 including stacking folded track segments on a non-metallized conveying foil made of a synthetic material and causing said conveying foil to supply said stack to other fabrication steps, and applying a second, non-metallized synthetic foil onto said stack and bonding it to the conveying foil.

9. A process according to claim 1 including inserting the folded track segments into contacting clamps in such a manner that the contacting clamps encompass the folded edges, providing that said clamps have recesses in the area of the folded edges, and providing an electrically conductive coating in these recesses.

10. A process according to claim 9 including placing a stack of folded track segments perpendicularly on their folded edges on a first conveyor belt which has a U-shaped contacting clamp, using a second clamp that is connected integrally with a second conveyor belt to overlie the stack of folded track segments, and, by means of pressure, hardening the stack, frontally contacting the stack by means of a metal spray process in the area of the "U" and severing the stack from the conveyor belt in such manner that parts of the conveyor belt remain on the contacting clamps as external electrical connections.

11. A process according to claim 1 including using a light beam to cut off segments from the folded track.

12. A process according to claim 11 including first, forming metal-free strips with at least one laser beam next to the cut edges to be generated and, subsequently cutting the segments from the folded track.

13. A process according to claim 12 including measuring the capacitance of the capacitor coatings and automatically adjusting the width of metal-free strips at the edges of said coatings according to this measurement in such manner that the capacitance of the capacitor is brought to a desired value.

14. A process according to claim 1 including measuring the capacitance of a folded track segment, adjusting the length of said folded track segment in accordance with said measurement in such a manner that the capacitance of the capacitor, when completed, will reside within allowable tolerances.

* * * * *